(12) United States Patent
Maali et al.

(10) Patent No.: US 6,567,775 B1
(45) Date of Patent: May 20, 2003

(54) FUSION OF AUDIO AND VIDEO BASED SPEAKER IDENTIFICATION FOR MULTIMEDIA INFORMATION ACCESS

(75) Inventors: Fereydoun Maali, New York, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/558,371

(22) Filed: Apr. 26, 2000

(51) Int. Cl.$^7$ .......................... G01L 15/00; G01L 21/00

(52) U.S. Cl. ....................... 704/231; 704/273

(58) Field of Search ................. 704/200, 231, 704/246, 251, 270, 272, 273, 235, 260; 712/10; 382/157, 203

(56) References Cited

U.S. PATENT DOCUMENTS

| | | | | |
|---|---|---|---|---|
| 4,449,189 A | * | 5/1984 | Feix et al. | 704/272 |
| 5,226,092 A | * | 7/1993 | Chen | 382/157 |
| 5,659,662 A | | 8/1997 | Wilcox et al. | |
| 6,028,960 A | * | 2/2000 | Graf et al. | 382/203 |
| 6,460,127 B1 | * | 10/2002 | Akerib | 712/10 |

OTHER PUBLICATIONS

S. Dharanipragada et al., "Experimental Results in Audio Indexing," Proc. ARPA SLT Workshop, (Feb. 1996), 4 pages.
L. Polymenakos et al., "Transcription of Broadcast News—Some Recent Improvements to IBM's LVCSR System," Proc. ARPA SLT Workshop, (Feb. 1996), 4 pages.
R. Bakis, "Transcription of Broadcast News Shows with the IBM Large Vocabulary Speech Recognition System," Proc. ICASSP98, Seattle, WA (1998), 6 pages.
H. Beigi et al., "A Distance Measure Between Collections of Distributions and its Application to Speaker Recognition," Proc. ICASSP98, Seattle, WA (1998), 4 pages.
S. Chen, "Speaker, Environment and Channel Change Detection and Clustering via the Bayesian Information Criterion," Proceedings of the Speech Recognition Workshop (1998), 6 pages.
S. Chen et al., "Clustering via the Bayesian Information Criterion with Applications in Speech Recognition," Proc. ICASSP98, Seattle, WA (1998), 4 pages.
S. Chen et al., "IBM's LVCSR System for Transcription of Broadcast News Used in the 1997 Hub4 English Evaluation," Proceedings of the Speech Recognition Workshop (1998), 6 pages.

(List continued on next page.)

*Primary Examiner*—David D. Knepper
(74) *Attorney, Agent, or Firm*—Ryan, Mason & Lewis, LLP; Thu Ann Dang

(57) ABSTRACT

A method and apparatus are disclosed for identifying a speaker in an audio-video source using both audio and video information. An audio-based speaker identification system identifies one or more potential speakers for a given segment using an enrolled speaker database. A video-based speaker identification system identifies one or more potential speakers for a given segment using a face detector/recognizer and an enrolled face database. An audio-video decision fusion process evaluates the individuals identified by the audio-based and video-based speaker identification systems and determines the speaker of an utterance in accordance with the present invention. A linear variation is imposed on the ranked-lists produced using the audio and video information. The decision fusion scheme of the present invention is based on a linear combination of the audio and the video ranked-lists. The line with the higher slope is assumed to convey more discriminative information. The normalized slopes of the two lines are used as the weight of the respective results when combining the scores from the audio-based and video-based speaker analysis. In this manner, the weights are derived from the data itself.

14 Claims, 8 Drawing Sheets

OTHER PUBLICATIONS

S. Dharanipragada et al., "A Fast Vocabulary Independent Algorithm for Spotting Words in Speech," Proc. ICASSP98, Seattle, WA (1998), 4 pages.

J. Navratil et al., "An Efficient Phonotactic–Acoustic system for Language Identification," Proc. ICASSP98, Seattle, WA (1998), 4 pages.

G. N. Ramaswamy et al., "Compression of Acoustic Features for Speech Recognition in Network Environments," Proc. ICASSP98, Seattle, WA (1998), 4 pages.

S. Chen et al., "Recent Improvements to IBM's Speech Recognition System for Automatic Transcription of Broadcast News," Proceedings of the Speech Recognition Workshop (1999), 6 pages.

S. Dharanipragada et al., "Story Segmentation and Topic Detection in the Broadcast News Domain," Proceedings of the Speech Recognition Workshop (1999), 4 pages.

C. Neti et al., "Audio–Visual Speaker Recognition for Video Broadcast News," Proceedings of the Speech Recognition Workshop (1999), 3 pages.

\* cited by examiner

FIG. 2

200 TIME-STAMPED WORD DATABASE

| | WORD STRING (220) | START TIME (230) | WORD DURATION (240) |
|---|---|---|---|
| 211 | 1 | $t_1$ | |
| 212 | 2 | $t_2$ | |
| 213 | ⋮ | ⋮ | ⋮ |
| 214 | N | $t_N$ | |

FIG. 3

300 SPEAKER TURN DATABASE

| | SEGMENT NUMBER (320) | START TIME (330) | SPEAKER LABEL (BEST GUESS) (340) | SCORE (350) | ALTERNATE SPEAKER LABEL(S) (360) | ALTERNATE SPEAKER SCORE(S) (370) |
|---|---|---|---|---|---|---|
| 305 | 1 | $T_A$ | SPEAKER X | $S_{10}$ | SPEAKER K | $S_{10-a}$ |
| 306 | 2 | $T_K$ | SPEAKER K | $S_{11}$ | SPEAKER L | $S_{11-a}$ |
| 307 | ⋮ | ⋮ | ⋮ | ⋮ | ⋮ | ⋮ |
| 308 | N | $T_E$ | SPEAKER G | $S_{12}$ | SPEAKER P | $S_{12-a}$ |

600

| RANK | AUDIO | | VIDEO | | FUSED | |
|---|---|---|---|---|---|---|
| 1 | UM | 1.0 | JW | 1.0 | OH | .99 |
| 2 | OH | .997 | OH | .988 | AK | .966 |
| 3 | UF | .989 | AK | .961 | GB | .941 |
| 4 | AK | .988 | SF | .939 | JM | .936 |
| 5 | JM | .986 | GB | .932 | JW | .808 |
| 6 | GB | .98 | JM | .925 | SF | .759 | ns
FUSION OF AUDIO AND VIDEO BASED SPEAKER IDENTIFICATION FOR MULTIMEDIA INFORMATION ACCESS

CROSS-REFERENCE TO RELATED APPLICATIONS

The present application is related to U.S. patent application Ser. No. 09/345,237, filed Jun. 30, 1999, entitled "Methods and Apparatus for Concurrent Speech Recognition, Speaker Segmentation and Speaker Classification," and U.S. patent application Ser. No. 09/369,706, filed Aug. 6, 1999, entitled "Methods and Apparatus for Audio-Visual Speaker Recognition and Utterance Verification," each assigned to the assignee of the present invention and incorporated by reference herein.

FIELD OF THE INVENTION

The present invention relates generally to speech recognition and speaker identification systems and, more particularly, to methods and apparatus for using video and audio information to provide improved speaker identification.

BACKGROUND OF THE INVENTION

Many organizations, such as broadcast news organizations and information retrieval services, must process large amounts of audio information, for storage and retrieval purposes. Frequently, the audio information must be classified by subject or speaker name, or both. In order to classify audio information by subject, a speech recognition system initially transcribes the audio information into text for automated classification or indexing. Thereafter, the index can be used to perform query-document matching to return relevant documents to the user. The process of classifying audio information by subject has essentially become fully automated.

The process of classifying audio information by speaker, however, often remains a labor intensive task, especially for real-time applications, such as broadcast news. While a number of computationally-intensive off-line techniques have been proposed for automatically identifying a speaker from an audio source using speaker enrollment information, the speaker classification process is most often performed by a human operator who identifies each speaker change, and provides a corresponding speaker identification.

Humans may be identified based on a variety of attributes of the person, including acoustic cues, visual appearance cues and behavioral characteristics, such as characteristic gestures or lip movements. In the past, machine implementations of person identification have focused on single techniques relating to audio cues alone (for example, audio-based speaker recognition), visual cues alone (for example, face identification or iris identification) or other biometrics. More recently, however, researchers have attempted to combine multiple modalities for person identification, see, e.g., J. Bigun, B. Duc, F. Smeraldi, S. Fischer and A. Makarov, "Multi-Modal Person Authentication," In H. Wechsler, J. Phillips, V. Bruce, F. Fogelman Soulie, T. Huang (eds.) Face Recognition: From Theory to Applications, Berlin Springer-Verlag, 1999. U.S. patent application Ser. No. 09/369,706, filed Aug. 6, 1999, entitled "Methods and Apparatus for Audio-Visual Speaker Recognition and Utterance Verification," assigned to the assignee of the present invention, discloses methods and apparatus for using video and audio information to provide improved speaker recognition.

Speaker recognition is an important technology for a variety of applications including security applications and such indexing applications that permit searching and retrieval of digitized multimedia content. Indexing systems, for example, transcribe and index audio information to create content index files and speaker index files. The generated content and speaker indexes can thereafter be utilized to perform query-document matching based on the audio content and the speaker identity. The accuracy of such indexing systems, however, depends in large part on the accuracy of the identified speaker. The accuracy of currently available speaker recognition systems, however, requires further improvements, especially in the presence of acoustically degraded conditions, such as background noise, and channel mismatch conditions. A need therefore exists for a method and apparatus that automatically transcribes audio information and concurrently identifies speakers in real-time using audio and video information. A further need exists for a method and apparatus for providing improved speaker recognition that successfully perform in the presence of acoustic degradation, channel mismatch, and other conditions which have hampered existing speaker recognition techniques. Yet another need exists for a method and apparatus for providing improved speaker recognition that integrates the results of speaker recognition using audio and video information.

SUMMARY OF THE INVENTION

Generally, a method and apparatus are disclosed for identifying the speakers in an audio-video source using both audio and video information. The disclosed audio transcription and speaker classification system includes a speech recognition system, a speaker segmentation system, an audio-based speaker identification system and a video-based speaker identification system. The audio-based speaker identification system identifies one or more potential speakers for a given segment using an enrolled speaker database. The video-based speaker identification system identifies one or more potential speakers for a given segment using a face detector/recognizer and an enrolled face database. An audio-video decision fusion process evaluates the individuals identified by the audio-based and video-based speaker identification systems and determines the speaker of an utterance in accordance with the present invention.

In one implementation, a linear variation is imposed on the ranked-lists produced using the audio and video information by: (1) removing outliers using the Hough transform; and (2) fitting the surviving points set to a line using the least mean squares error method. Thus, the ranked identities output by the audio and video identification systems are reduced to two straight lines defined by:

$$audioScore = m_1 \times rank + b_1; \text{ and}$$

$$videoScore = m_2 \times rank + b_2.$$

The decision fusion scheme of the present invention is based on a linear combination of the audio and the video ranked-lists. The line with the higher slope is assumed to convey more discriminative information. The normalized slopes of the two lines are used as the weight of the respective results when combining the scores from the audio-based and video-based speaker analysis.

The weights assigned to the audio and the video scores affect the influence of their respective scores on the ultimate outcome. According to one aspect of the invention, the weights are derived from the data itself. With $w_1$ and $w_2$ representing the weights of the audio and the video channels, respectively, the fused score, $FS_k$, for each speaker is computed as follows:

$$w_1 = \frac{m_1}{m_1 + m_2} \text{ and } w_2 = \frac{m_2}{m_1 + m_2}$$

$$FS_k = W_1(m_1 \times \text{rank}_k + b_1) + w_2(m_2 \times \text{rank}_k + b_2).$$

where $\text{rank}_k$ is the rank for speaker k.

A more complete understanding of the present invention, as well as further features and advantages of the present invention, will be obtained by reference to the following detailed description and drawings.

BRIEF DESCRIPTION OF THE DRAWINGS

FIG. 2 is a table from the time-stamped word database of FIG. 1;

FIG. 3 is a table from the speaker turn database of FIG. 1;

DETAILED DESCRIPTION OF PREFERRED EMBODIMENTS

Figure 1:
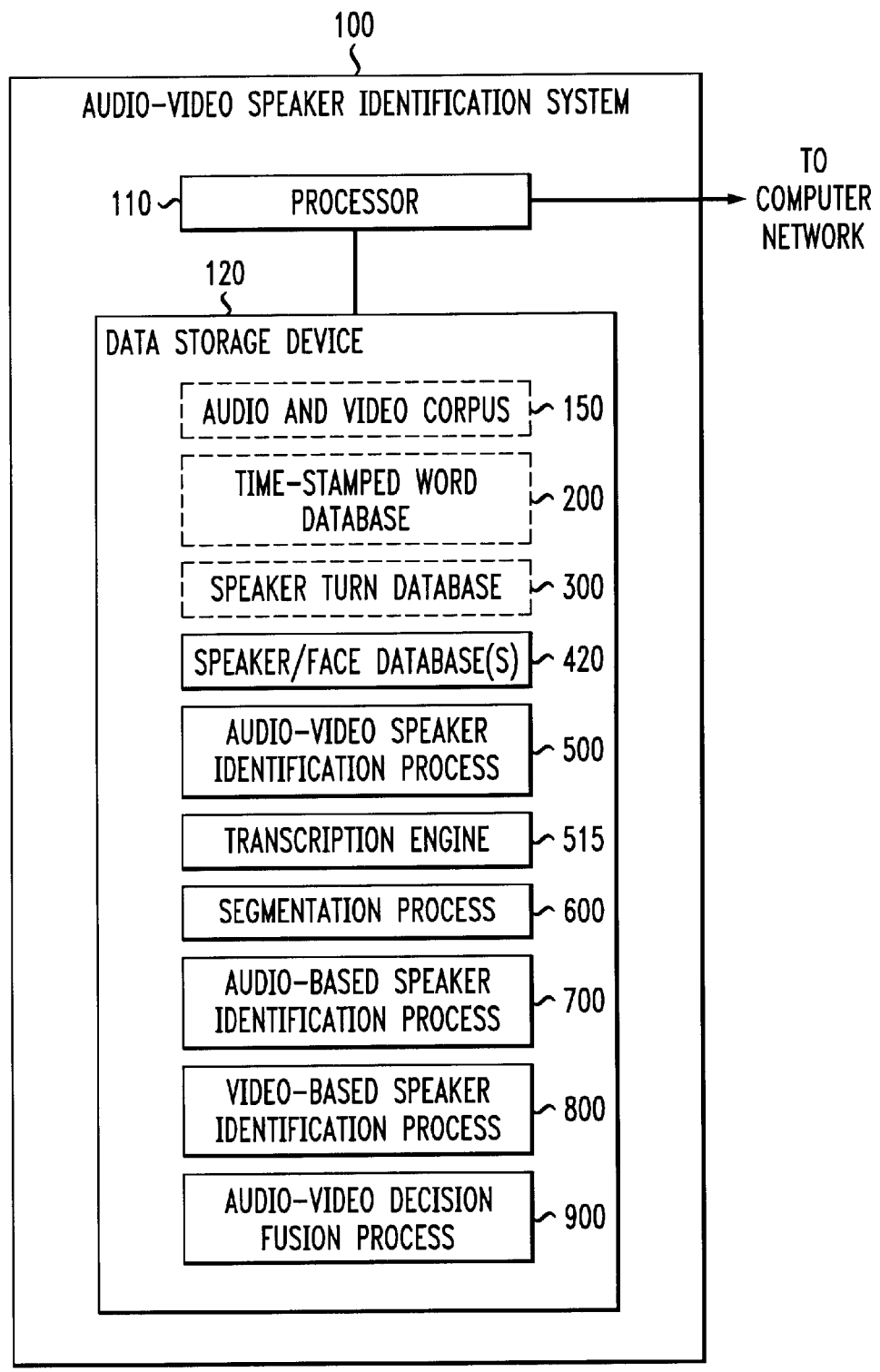
FIG. 1 is a block diagram of an audio-video speaker identification system according to the present invention.

FIG. 1 illustrates an audio-video speaker identification system 100 in accordance with the present invention that automatically transcribes audio information from an audio-video source and concurrently identifies the speakers using both audio and video information. The audio-video source file may be, for example, an audio recording or live feed, for example, from a broadcast news program. The audio-video source is initially transcribed and processed to identify all possible frames where there is a segment boundary, indicating a speaker change.

The audio-video speaker identification system 100 includes a speech recognition system, a speaker segmentation system, an audio-based speaker identification system and a video-based speaker identification system. The speech recognition system produces transcripts with time-alignments for each word in the transcript. The speaker segmentation system separates the speakers and identifies all possible frames where there is a segment boundary. A segment is a continuous portion of the audio source associated with a given speaker. The audio-based speaker identification system thereafter uses an enrolled speaker database to assign a speaker to each identified segment. The video-based speaker identification system thereafter uses a face detector/recognizer and an enrolled face database to independently assign a speaker to each identified segment.

FIG. 1 is a block diagram showing the architecture of an illustrative audio-video speaker identification system 100 in accordance with the present invention. The audio-video speaker identification system 100 may be embodied as a general purpose computing system, such as the general purpose computing system shown in FIG. 1. The audio-video speaker identification system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes an audio and video corpus database 150 for storing one or more prerecorded or live audio or video files (or both) that can be processed in real-time in accordance with the present invention. The data storage device 120 also includes a time-stamped word database 200, discussed further below in conjunction with FIG. 2, a speaker turn database 300, discussed further below in conjunction with FIG. 3, and a speaker/face database 420, discussed below in conjunction with FIG. 4,. The time-stamped word database 200 is produced by the speech recognition system and includes a set of time-stamped words. The speaker turn database 300 is produced by the audio-video speaker identification systems, in conjunction with the speaker segmentation system, and indicates the start time of each segment, together with one or more corresponding suggested speaker labels. The speaker/face database 420 is produced by a speaker enrollment process 410 and includes an entry for each enrolled speaker and each enrolled face. It is noted that the generated databases 200 and 300 shown in the illustrative embodiment of FIG. 1 may not be required for an online implementation where the results of the present invention are displayed to a user in real-time, and are not required for subsequent access.

In addition, as discussed further below in conjunction with FIGS. 5 through 9, the data storage device 120 includes an audio-video speaker identification process 500, a transcription engine 515, a segmentation process 600, an audio-based speaker identification process 700, a video-based speaker identification process 800 and an audio-video decision fusion process 900. The audio-video speaker identification process 50 coordinates the execution of the transcription engine 515, segmentation process 600, audio-based speaker identification process 700, a video-based speaker identification process 800 and an audio-video decision fusion process 900. The audio-video speaker identification process 500 analyzes one or more audio and video files in the audio/video corpus database 150 and produces a transcription of the audio information in real-time, that indicates the speaker associated with each segment based on the audio and video information and using the enrolled speaker/face database(s) 420. The segmentation process 600 separates the speakers and identifies all possible frames where there is a segment boundary. The audio-based and video-based speaker identification processes 700, 800 generate a ranked-list of potential speakers based on the audio and video information, respectively. The audio-video decision fusion process 900 evaluates the ranked lists produced by the audio-based and video-based speaker identification processes 700, 800 and determines the speaker of an utterance in accordance with the present invention.

FIG. 2 illustrates an exemplary time-stamped word database 200 that is produced by the speech recognition system and includes a set of time-stamped words. The time-stamped word database 200 maintains a plurality of records, such as records 211 through 214, each associated with a different word in the illustrative embodiment. For each word identified in field 220, the time-stamped word database 200 indicates the start time of the word in field 230 and the duration of the word in field 240.

FIG. 3 illustrates an exemplary speaker turn database 300 that is produced by the audio-video speaker identification system 100, in conjunction with the speaker segmentation system, and indicates the start time of each segment, together with one or more corresponding suggested speaker labels. The speaker turn database 300 maintains a plurality of records, such as records 305 through 308, each associated with a different segment in the illustrative embodiment. For each segment identified by a segment number in field 320, the speaker turn database 300 indicates the start time of the segment in field 330, relative to the start time of the audio/video source file. In addition, the speaker turn database 300 identifies the speaker associated with each segment in field 340, together with the corresponding speaker score in field 350. In one implementation, the speaker turn database 300 also identifies one or more alternate speakers (next best guesses) associated with each segment in field 360, together with the corresponding alternate speaker score in field 370. The generation of a speaker score based on both audio and video information is discussed further below in conjunction with FIG. 9.

Speaker/Face Registration Process

Figure 4:
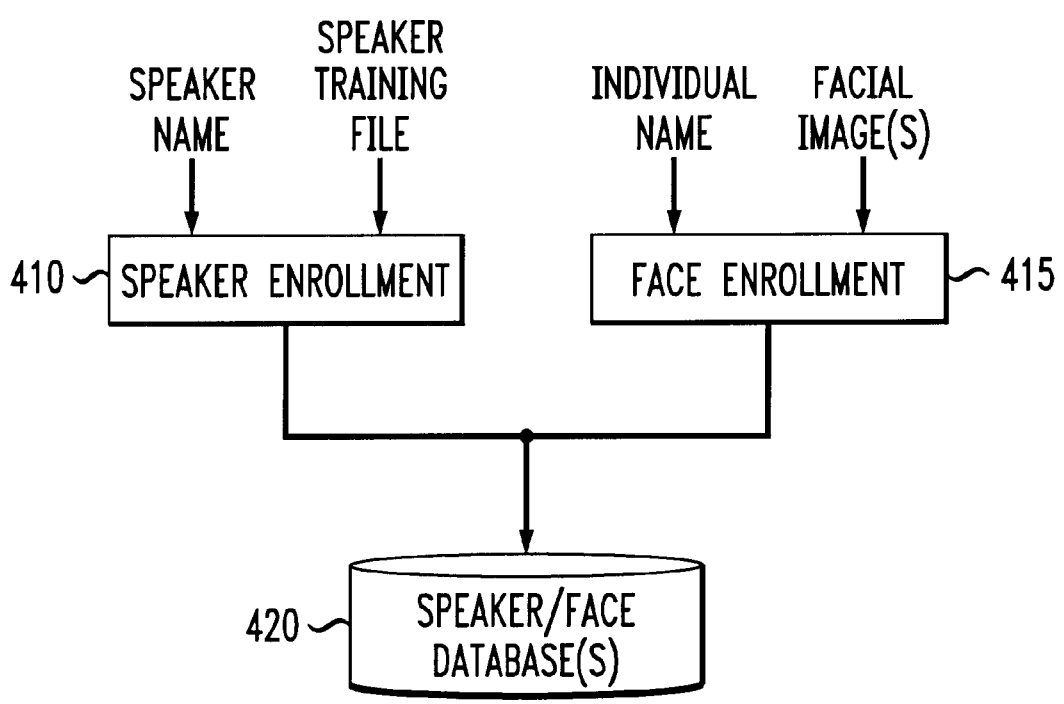
FIG. 4 illustrates representative speaker and face enrollment processes in accordance with the present invention.

FIG. 4 illustrates a known process used to register or enroll speakers and faces of individuals. As shown in FIG. 4, for each registered speaker, the name of the speaker is provided to a speaker enrollment process 410, together with a speaker training file, such as a pulse-code modulated (PCM) file. The speaker enrollment process 410 analyzes the speaker training file, and creates an entry for each speaker in a speaker database 420. The process of adding speaker's voice samples to the speaker database 420 is called enrollment. The enrollment process is offline and the speaker identification system assumes such a database exists for all speakers of interest. About a minute's worth of audio is generally required from each speaker from multiple channels and microphones encompassing multiple acoustic conditions. The training data or database of enrolled speakers is stored using a hierarchical structure so that accessing the models is optimized for efficient recognition and retrieval.

Likewise, for each registered individual, the name of the individual is provided to a face enrollment process 415, together with one or more facial images. The face enrollment process 415 analyzes the facial images, and creates an entry for each individual in a face database 420. For a detailed discussion of a suitable face enrollment process 415, see, for example, A. Senior, "Face and Feature Finding for Face Recognition System," 2d Intl. Conf. on Audio- and Video-based Biometric Person Authentication, Washington D.C. (March 1999); A. Senior, "Recognizing Faces in Broadcast Video," Proc. IEEE International. Workshop on Recog., Anal., and Tracking of Faces and Gestures in Real-Time Systems, 105–110, Kerkyra, Greece (1999), each incorporated by reference herein.

Processes

Figure 5:
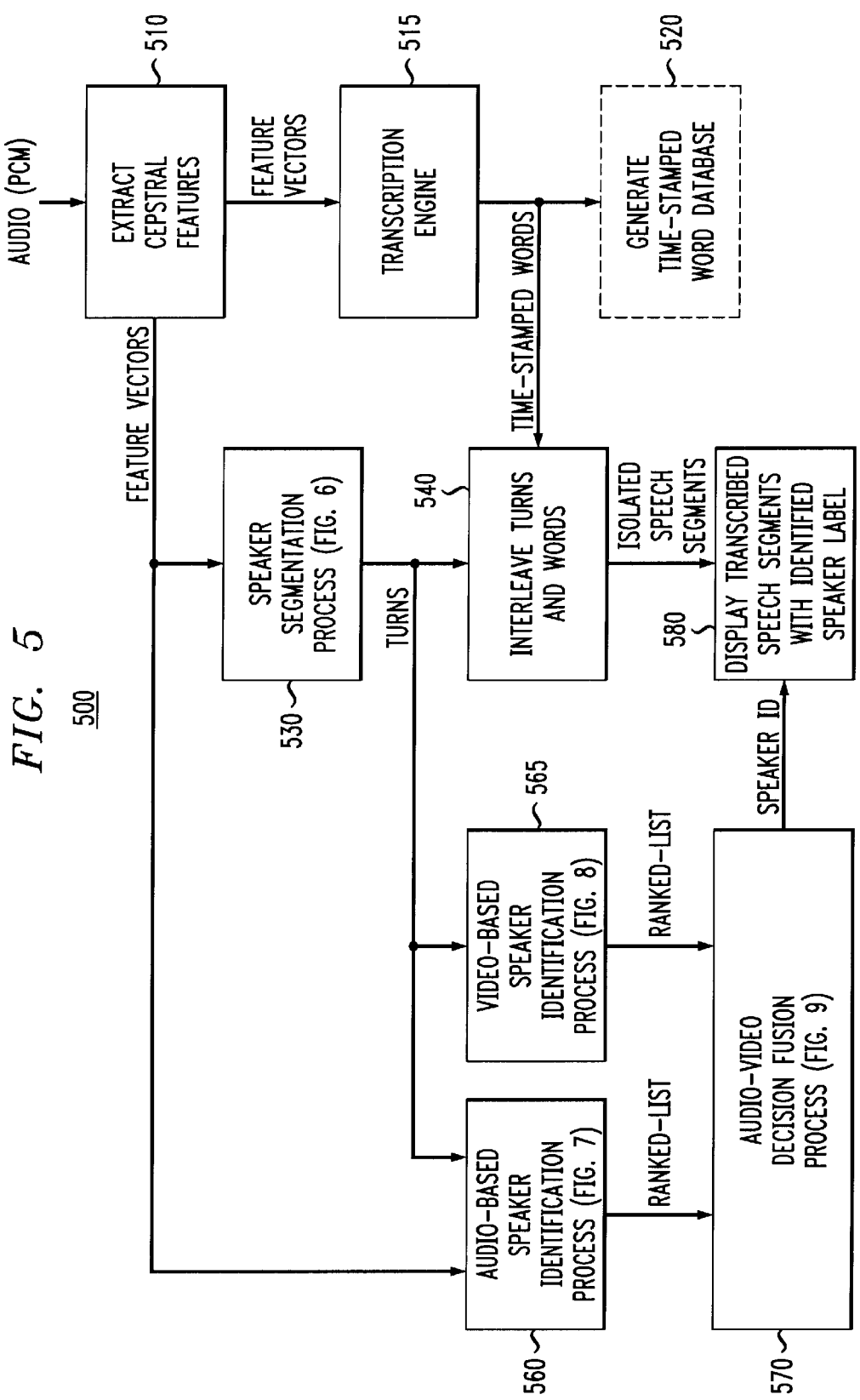
FIG. 5 is a flow chart describing an exemplary audio-video speaker identification process performed by the audio-video speaker identification system of FIG. 1.
Figure 7:
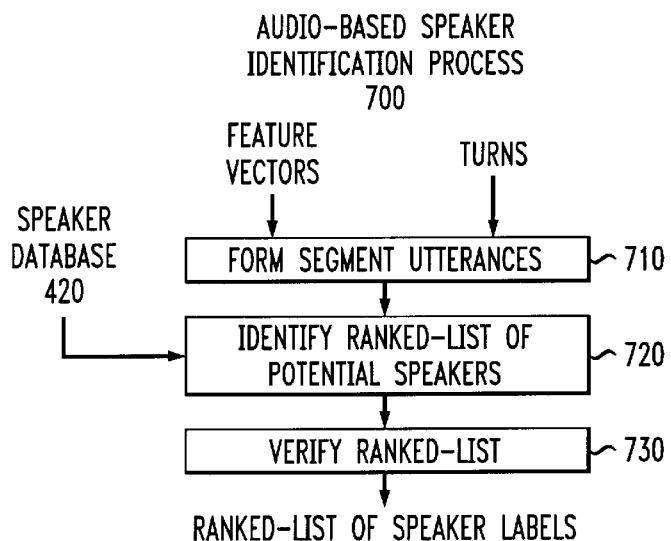
FIG. 7 is a flow chart describing an exemplary audio-based speaker identification process performed by the audio-video speaker identification process of FIG. 5.
Figure 8:
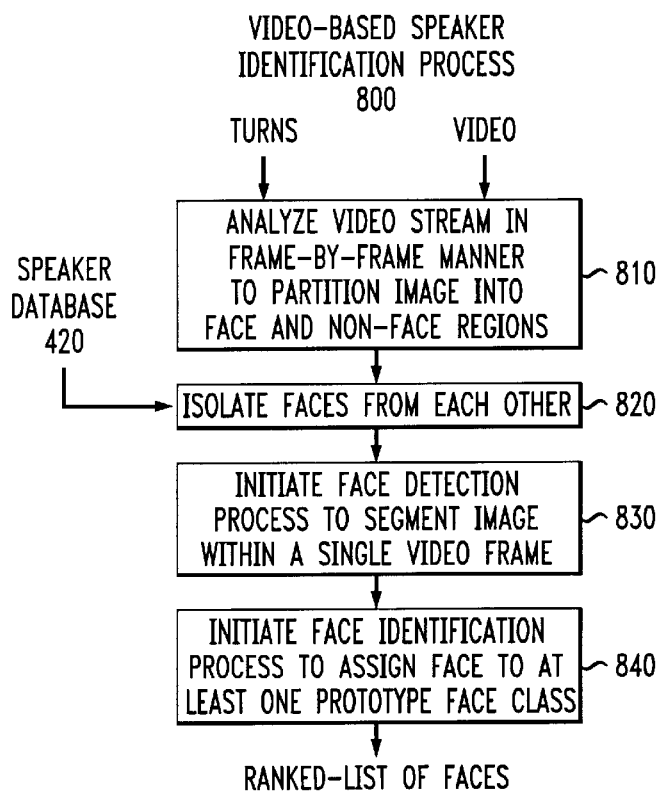
FIG. 8 is a flow chart describing an exemplary video-based speaker identification process performed by the audio-video speaker identification process of FIG. 5.
Figure 9:
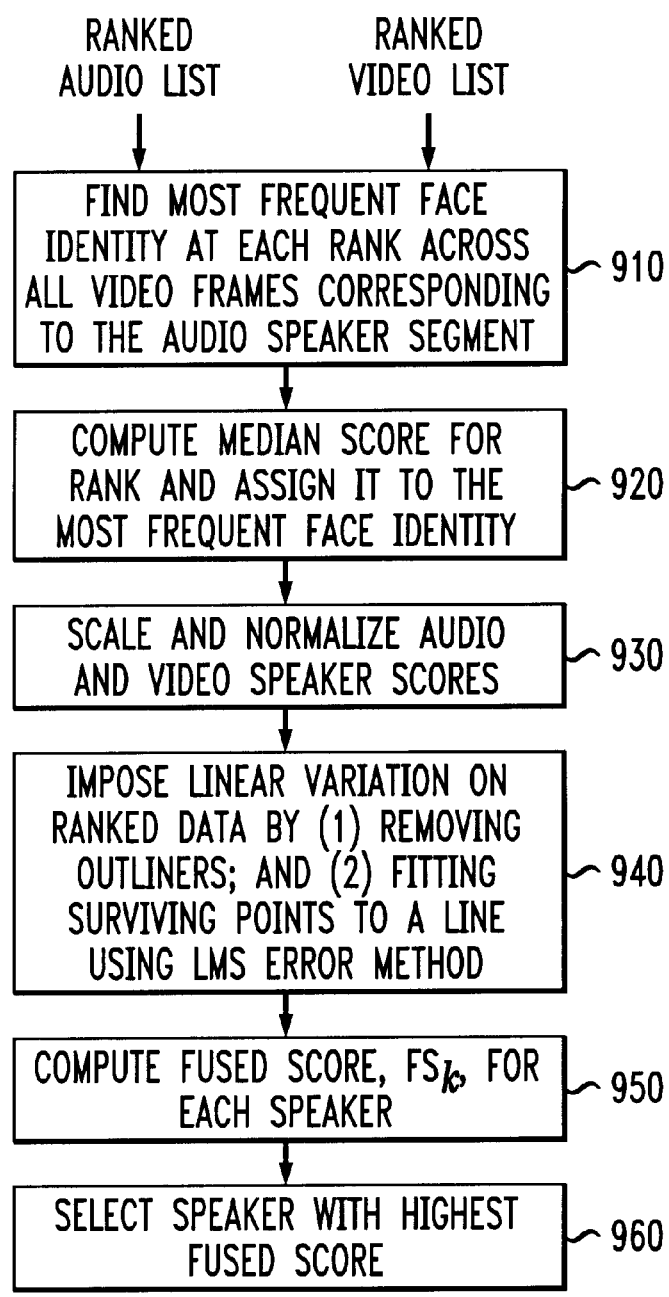
FIG. 9 is a flow chart describing an exemplary audio-video decision fusion process performed by the audio-video speaker identification process of FIG. 5.

As previously indicated, the audio-video speaker identification process 500, shown in FIG. 5, coordinates the execution of the transcription engine 515, segmentation process 600 (FIG. 6), audio-based speaker identification process 700 (FIG. 7), a video-based speaker identification process 800 (FIG. 8) and an audio-video decision fusion process 900 (FIG. 9). The audio-video speaker identification process 500 analyzes one or more audio/video files in the audio/video corpus database 150 and produces a transcription of the audio information in real-time, that indicates the speaker associated with each segment based on the audio and video information. As shown in FIG. 5, the audio-video speaker identification process 500 initially extracts cepstral features from the audio files during step 510, in a known manner. Generally, step 510 changes the domain of the audio signal from a temporal domain to the frequency domain, analyzes the signal energy in various frequency bands, and applies another transform to change the domain of the signal to the cepstral domain.

As shown in FIG. 5, step 510 provides common front-end processing for the transcription engine 515, segmentation process 600 (FIG. 6), audio-based speaker identification process 700 (FIG. 7), a video-based speaker identification process 800 (FIG. 8) and an audio-video decision fusion process 900 (FIG. 9). Generally, the feature vectors computed during step 510 can be distributed to the three multiple processing threads corresponding to the transcription engine 515, segmentation process 600 (FIG. 6) and speaker identification processes 700, 800 (FIGS. 7 and 8). The feature vectors can be distributed to the three multiple processing threads, for example, using a shared memory architecture that acts in a server-like manner to distribute the computed feature vectors to each channel (corresponding to each processing thread).

The generated feature vectors are applied during step 515 to a transcription engine, such as the ViaVoice™ speech recognition system, commercially available from IBM Corporation of Armonk, N.Y., to produce a transcribed file of time-stamped words. Thereafter, the time-stamped words can optionally be collected into a time-stamped word database 200 during step 520. In addition, the time-stamped words are applied to an interleaver during step 540, discussed below.

The generated feature vectors are applied during step 530 to the segmentation process 600, discussed further below in conjunction with FIG. 6. Generally, the segmentation process 600 separates the speakers and identifies all possible frames where there is a segment boundary between non-homogeneous speech portions. Each frame where there is a segment boundary is referred to as a turn and each homogeneous segment should correspond to the speech of a single speaker. Once delineated by the segmentation process 600, each segment can be classified as having been spoken by a particular speaker (assuming the segment meets the minimum segment length requirement required for speaker recognition system).

The turns identified by the segmentation process 600, together with the feature vectors generated during step 510, are then applied to the audio and video based speaker identification processes 700, 800 during steps 560 and 565, discussed further below in conjunction with FIGS. 7 and 8, respectively, to assign a speaker label to each segment using audio and video information, respectively. Generally, the audio-based speaker identification process 700 compares the segment utterances to the speaker database 420 (FIG. 4) during step 560 and generates a ranked-list of potential speakers based on the audio information. Likewise, the video-based speaker identification process 800 identifies a face in the video stream, compares the face to the face database 420 (FIG. 4) during step 565 and generates a ranked-list of potential individuals based on the video information. The ranked-lists produced by the speaker identification processes 700, 800 are evaluated by the audio-video decision fusion process 900 during step 570 to determine the speaker of an utterance in accordance with the present invention.

The time-stamped words produced by the transcription engine during step 515, together with the speaker turns identified by the segmentation process 600 during step 530 are applied to an interleaver during step 540 to interleave the turns with the time-stamped words and produce isolated speech segments. The isolated speech segments and speaker identifications produced by the fusion process during step 570 are then displayed to the user during step 580.

In one implementation, the isolated speech segments are displayed in real-time as they are produced by the interleaver during step 540. In addition, in the illustrative embodiment, the minimum segment length required for the speaker recognition system is eight seconds. Thus, the speaker identification labels will generally be appended to the transcribed text approximately eight seconds after the beginning of the isolated speech segment is first presented. It is noted that if the isolated speech segment is shorter than the minimum segment length required for the speaker recognition system, then a speaker label such as "inconclusive" can be assigned to the segment.

Bayesian Information Criterion (BIC) Background

Figure 6:
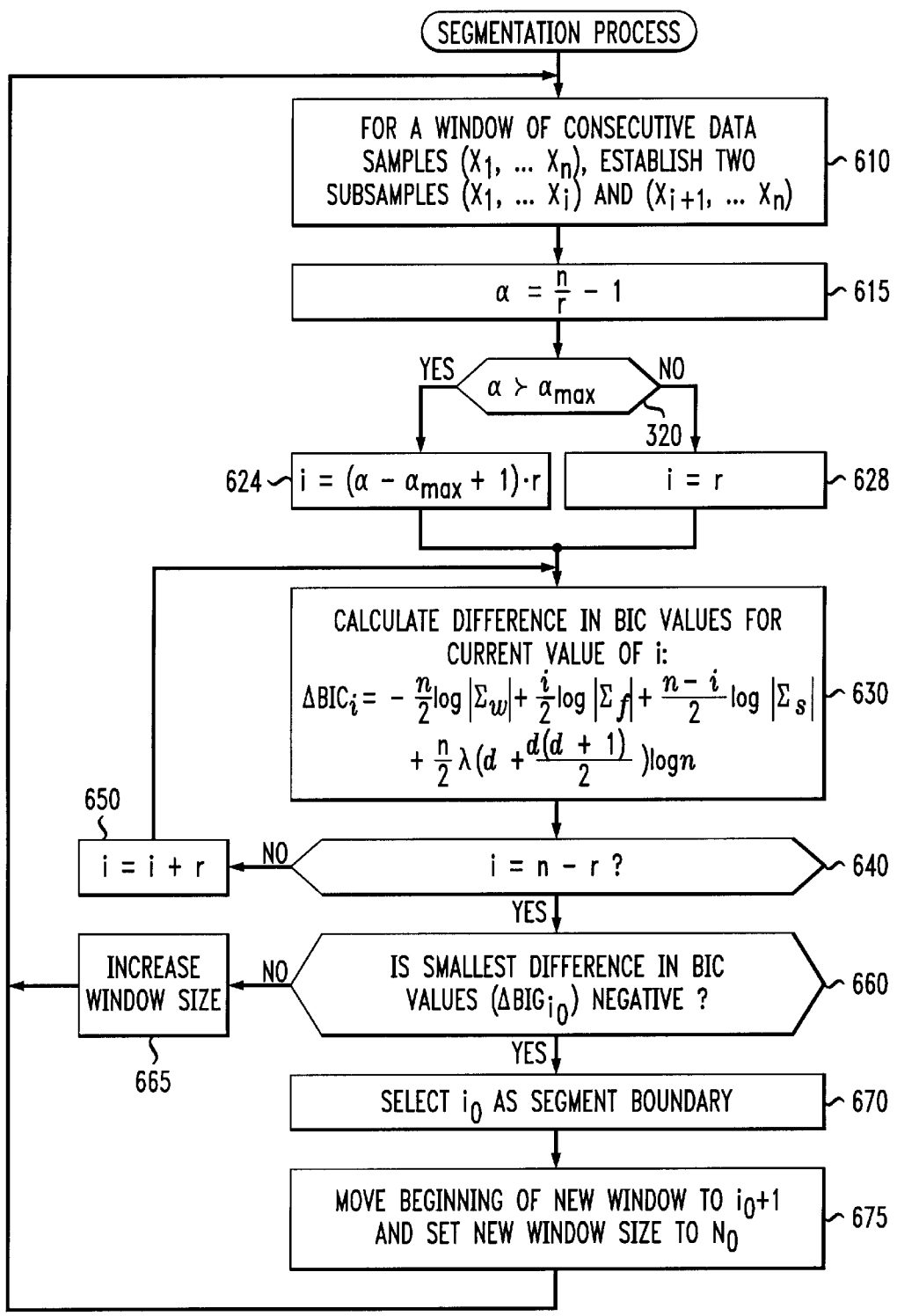
FIG. 6 is a flow chart describing an exemplary segmentation process performed by the audio-video speaker identification system of FIG. 1.

As previously indicated, the segmentation process 600, shown in FIG. 6, separates the speakers and identifies all possible frames where there is a segment boundary between non-homogeneous speech portions. Each frame where there is a segment boundary is referred to as a turn and each homogeneous segment should correspond to the speech of a single speaker. Once delineated by the segmentation process 600, each segment can be classified as having been spoken by a particular speaker (assuming the segment meets the minimum segment length requirement required for speaker recognition system). The segmentation process 600 is based on the Bayesian Information Criterion (BIC) model-selection criterion. BIC is an asymptotically optimal Bayesian model-selection criterion used to decide which of p parametric models best represents n data samples $x_1, \ldots, x_n$, $x_i \in R^d$. Each model $M_j$ has a number of parameters, $k_j$. The samples $x_i$ are assumed to be independent.

For a detailed discussion of the BIC theory, see, for example, G. Schwarz, "Estimating the Dimension of a Model," The Annals of Statistics, Vol. 6, 461–464 (1978) or S. S. Chen and P. S. Gopalkrishnan, "Speaker, Environment and Channel Change Detection and Clustering Via the Bayesian Information Criterian," Proc. of DARPA Workshop, 127–132 (1998), each incorporated by reference herein. According to the BIC theory, for sufficiently large n, the best model of the data is the one which maximizes $$BIC_j = \log L_j(x_1, \ldots, x_n) - \tfrac{1}{2}\lambda k_j \log n \qquad \text{Eq.(1)}$$

where $\lambda=1$, and where $L_j$ is the maximum likelihood of the data under model $M_j$ (in other words, the likelihood of the data with maximum likelihood values for the $k_j$ parameters of $M_j$). When there are only two models, a simple test is used for model selection. Specifically, the model $M_1$ is selected over the model $M_2$ if $\Delta BIC = BIC_1 - BIC_2$, is positive. Likewise, the model $M_2$ is selected over the model $M_1$ if $\Delta BIC = BIC_1 - BIC_2$, is negative.

Speaker Segmentation

The segmentation process 600, shown in FIG. 6, identifies all possible frames where there is a segment boundary. Without loss of generality, consider a window of consecutive data samples $(x_1, \ldots x_n)$ in which there is at most one segment boundary.

The basic question of whether or not there is a segment boundary at frame i can be cast as a model selection problem between the following two models: model $M_1$, where $(x_1, \ldots x_n)$ is drawn from a single full-covariance Gaussian, and model $M_2$, where $(x_1, \ldots x_n)$ is drawn from two full-covariance Gaussians, with $(x_1, \ldots, x_i)$ drawn from the first Gaussian, and $(x_{i+1}, \ldots x_n)$ drawn from the second Gaussian.

Since $x_i \in R^d$, model $M_1$ has $$k_1 = d + \frac{d(d+1)}{2}$$

parameters, while model $M_2$ has twice as many parameters $(k_2 = 2k_1)$. It can be shown that the $i^{th}$ frame is a good candidate for a segment boundary if the expression:

$$\Delta BIC_i = -\frac{n}{2}\log|\Sigma_w| + \frac{i}{2}\log|\Sigma_f| + \frac{n-i}{2}\log|\Sigma_s| + \frac{1}{2}\lambda\left(d + \frac{d(d+1)}{2}\right)\log n$$

is negative, where $|\Sigma_w|$ is the determinant of the covariance of the whole window (i.e., all n frames), $|\Sigma_f|$ is the determinant of the covariance of the first subdivision of the window, and $|\Sigma_s|$ is the determinant of the covariance of the second subdivision of the window.

Thus, two subsamples, $(x_1, \ldots, x_i)$ and $(x_{i+1}, \ldots x_n)$, are established during step 610 from the window of consecutive data samples $(x_1, \ldots X_n)$. The segmentation process 600 performs a number of tests during steps 615 through 628 to eliminate some BIC tests in the window, when they correspond to locations where the detection of a boundary is very unlikely. Specifically, the value of a variable α is initialized during step 615 to a value of n/r−1, where r is the detection resolution (in frames). Thereafter, a test is performed during step 620 to determine if the value α exceeds a maximum value, $\alpha_{max}$. If it is determined during step 620 that the value α exceeds a maximum value, $\alpha_{max}$, then the counter i is set to a value of $(\alpha-\alpha_{max}+1)r$ during step 624. If, however, it is determined during step 620 that the value α a does not exceed a maximum value, $\alpha_{max}$, then the counter i is set to a value of r during step 628. Thereafter, the difference in BIC values is calculated during step 630 using the equation set forth above.

A test is performed during step 640 to determine if the value of i equals n−r. In other words, have all possible samples in the window been evaluated. If it is determined during step 640 that the value of i does not yet equal n−r, then the value of i is incremented by r during step 650 to continue processing for the next sample in the window at step 630. If, however, it is determined during step 640 that the value of i equals n−r, then a further test is performed during step 660 to determine if the smallest difference in BIC values ($\Delta BIC_{i0}$) is negative. If it is determined during step 660 that the smallest difference in BIC values is not negative, then the window size is increased during step 665 before returning to step 610 to consider a new window in the manner described above. Thus, the window size, n, is only increased when the ΔBIC values for all i in one window have been computed and none of them leads to a negative ΔBIC value.

If, however, it is determined during step 660 that the smallest difference in BIC values is negative, then $i_0$ is selected as a segment boundary during step 670. Thereafter, the beginning of the new window is moved to $i_0+1$ and the window size is set to $N_0$ during step 675, before program control returns to step 610 to consider the new window in the manner described above.

Thus, the BIC difference test is applied for all possible values of i, and $i_0$ is selected with the most negative $\Delta BIC_f$. A segment boundary can be detected in the window at frame i: if $\Delta BIC_{i0}<0$, then $x_{i0}$ corresponds to a segment boundary. If the test fails then more data samples are added to the current window (by increasing the parameter n) during step 660, in a manner described below, and the process is repeated with this new window of data samples until all the feature vectors have been segmented. Generally, the window size is extended by a number of feature vectors, which itself increases from one window extension to another. However, a window is never extended by a number of feature vectors larger than some maximum value. When a segment boundary is found during step 670, the window extension value retrieves its minimal value ($N_0$).

Audio-Based Speaker Identification Process

As previously indicated, the audio-video speaker identification process 500 executes an audio-based speaker identification process 700, shown in FIG. 7, during step 560 to generate a ranked-list of speakers for each segment using the audio information and the enrolled speaker database 420. As shown in FIG. 7, the audio-based speaker identification process 700 receives the turns identified by the segmentation process 600, together with the feature vectors generated by the common front-end processor during step 510. Generally, the speaker identification system compares the segment utterances to the speaker database 420 (FIG. 4) and generates a ranked-list of the "closest" speakers.

The turns and feature vectors are processed during step 710 to form segment utterances, comprised of chunks of speech by a single speaker. The segment utterances are applied during step 720 to a speaker identification system. For a discussion of a speaker identification system, see, for example, H. S. M. Beigi et al., "IBM Model-Based and Frame-By-Frame Speaker-Recognition," in Proc. of Speaker Recognition and Its Commercial and Forensic Applications, Avignon, France (1998). Generally, the speaker identification system compares the segment utterances to the speaker database 420 (FIG. 4) and finds the "closest" speakers.

While the speaker identification system may be implemented using one of two different implementations, namely, a model-based approach or a frame-based approach, the invention will be described using a frame-based approach.

Speaker Identification—Frame-By-Frame Approach

Let $M_i$ be the model corresponding to the $i^{th}$ enrolled speaker. $M_i$ is entirely defined by the parameter set, $\{\vec{\mu}_{i,j}, \Sigma_{i,j}, \vec{p}_{i,j}\}_{j=1,\ldots,n_i}$, consisting of the mean vector, covariance matrix, and mixture weight for each of the $n_i$ components of speaker i's Gaussian Mixture Model (GMM). These models are created using training data consisting of a sequence of M frames of speech, with the d-dimensional feature vector, $\{\vec{f}_m\}_{m=1,\ldots,M}$, as described in the previous section. If the size of the speaker population is $N_p$, then the set of the model universe is $\{M_i\}_{i=1,\ldots,N_p}$. The fundamental goal is to find the i such that Mi best explains the test data, represented as a sequence of N frames, $\{\vec{f}_n\}_{n=1,\ldots,N}$, or to make a decision that none of the models describes the data adequately. The following frame-based weighted likelihood distance measure, $d_{i,n}$, is used in making the decision:

$$d_{i,n} = -\log\left[\sum_{j=1}^{n_i} p_{i,j} p(f_n \mid j^{th}\overrightarrow{\text{component}} \text{ of } M_i)\right],$$

where, using a Normal representation, $$p(\vec{f}_n \mid \cdot) = \frac{1}{(2\pi)^{d/2}|\Sigma_{i,j}|^{1/2}} e^{-\frac{1}{2}(\overrightarrow{f_n - \mu_{i,j}})'\Sigma_{i,j}^{-1}(\overrightarrow{f_n - \mu_{i,j}})}$$

The total distance, $D_i$, of model $M_i$ from the test data is then taken to be the sum of all the distances over the total number of test frames.

For classification, the model with the smallest distance to that of the speech segment is chosen. By comparing the smallest distance to that of a background model, one could provide a method to indicate that none of the original models match very well. Alternatively, a voting technique may be used for computing the total distance.

For verification, a predetermined set of members that form the cohort of the labeled speaker is augmented with a variety of background models. Using this set as the model universe, the test data is verified by testing if the claimant's model has the smallest distance; otherwise, it is rejected.

This distance measure is not used in training since the frames of speech would have to retained for computing the distances between the speakers. The training is done, therefore, using the method for the model-based technique discussed above. The assigned speaker labels are optionally verified during step 730 by taking a second pass over the results of speaker classification. It is noted that an entry can optionally be created in the speaker turn database 300 indicating the best choice, together with the assigned score indicating the distance from the original enrolled speaker model to the audio test segment, and alternative choices from the ranked-list, if desired.

Video-Based Speaker Identification Process

As previously indicated, the audio-video speaker identification process 500 executes a video-based speaker identification process 800, shown in FIG. 8, during step 565 to generate a ranked-list of individuals for each segment using the video information and the face database 420. As shown in FIG. 8, the video-based speaker identification process 800 receives the turns identified by the segmentation process 600, together with the video feed. Generally, the speaker identification system compares the faces in the image to the face database 420 (FIG. 4) and generates a ranked-list of the "closest" faces.

As shown in FIG. 8, the video-based speaker identification process 800 initially analyzes the video stream in a frame-by-frame manner during step 810 to first segment the image by partitioning the image into face and non-face regions. The faces are then isolated from each other during step 820. A face detection process is initiated during step 830 to segment the image within a single video frame, as discussed below in a section entitled "Face Detection." In one implementation, the face is temporally "tracked" in each subsequent frame after it is first detected, to avoid employing the expensive detection operation on each frame. Face detection is required in any frame only when tracking fails and cannot be maintained.

A face identification process is initiated during step 840 to assign the face to any one of the number of prototype face classes in the database 420 when its landmarks exhibit the highest comparative similarity to the constituent landmarks of a given prototype face, as discussed below in a section entitled "Face Identification." Generally, within each face a number of landmarks are located. These landmarks are distinctive points on a human face. The ranked-list is then provided back to the audio-video speaker identification process 500.

Face Detection

Faces can occur at a variety of scales, locations and orientations in the video frames. In this system, we make the assumption that faces are close to the vertical, and that there is no face smaller than 66 pixels high. However, to test for a face at all the remaining locations and scales, the system searches for a fixed size template in an image pyramid. The image pyramid is constructed by repeatedly down-sampling the original image to give progressively lower resolution representations of the original frame. Within each of these sub-images, we consider all square regions of the same size as our face template (typically 11×11 pixels) as candidate face locations. A sequence of tests is used to test whether a region contains a face or not.

First, the region must contain a high proportion of skin-tone pixels, and then the intensities of the candidate region are compared with a trained face model. Pixels falling into a pre-defined cuboid of hue-chromaticity-intensity space are deemed to be skin tone, and the proportion of skin tone pixels must exceed a threshold for the candidate region to be considered further.

The face model is based on a training set of cropped, normalized, grey-scale face images. Statistics of these faces are gathered and a variety of classifiers are trained based on these statistics. A Fisher linear discriminant (FLD) trained with a linear program is found to distinguish between faces and background images, and "Distance from face space" (DFFS), as described in M. Turk and A. Pentland, "Eigenfaces for Recognition," Journal of Cognitive Neuro Science, vol. 3, no. 1, pp. 71–86, 1991, can be used to score the quality of faces given high scores by the first method. A high combined score from both these face detectors indicates that the candidate region is indeed a face. Candidate face regions with small perturbations of scale, location and rotation relative to high-scoring face candidates are also tested and the maximum scoring candidate among the perturbations is chosen, giving refined estimates of these three parameters.

In subsequent frames, the face is tracked by using a velocity estimate to predict the new face location, and models are used to search for the face in candidate regions near the predicted location with similar scales and rotations. A low score is interpreted as a failure of tracking, and the algorithm begins again with an exhaustive search.

Face Identification Having found the face, K facial features are located using the same techniques (FLD and DFFS) used for face detection. Features are found using a hierarchical approach where large-scale features, such as eyes, nose and mouth are first found, then sub-features are found relative to these features. A number of sub-features can be used, including the hairline, chin, ears, and the corners of mouth, nose, eyes and eyebrows. Prior statistics are used to restrict the search area for each feature and sub-feature relative to the face and feature positions, respectively. At each of the estimated sub-feature locations, a Gabor Jet representation, as described in L. Wiskott and C. von der Malsburg, "Recognizing Faces by Dynamic Link Matching," Proceedings of the International Conference on Artificial Neural Networks, pp. 347–352, 1995, is generated. A Gabor jet is a set of two-dimensional Gabor filters—each a sine wave modulated by a Gaussian. Each filter has scale (the sine wavelength and Gaussian standard deviation with fixed ratio) and orientation (of the sine wave). A number of scales and orientations can be used, giving complex coefficients, a(j), at each feature location.

A simple distance metric is used to compute the distance between the feature vectors for trained faces and the test candidates. The distance between the $i^{th}$ trained candidate and a test candidate for feature k is defined as:

$$S_{ik} = \frac{\sum_j a(j)a_i(j)}{\sqrt{\sum_j (a(j))^2 \sum_j (a_i(j))^2}}.$$

A simple average of these similarities, $$S_i = 1/K \sum_1^K S_{ik},$$

gives an overall measure for the similarity of the test face to the face template in the database. Accordingly, based on the similarity measure, an identification of the person in the video sequence under consideration is made. Furthermore, a ranked-list can be generated based on the average score of the similarities, $S_i$.

For a discussion of additional face detection and identification processes, see, for example, A. Senior, "Face and Feature Finding for Face Recognition System," 2d Intl. Conf. on Audio- and Video-based Biometric Person Authentication, Washington D.C. (March 1999); A. Senior, "Recognizing Faces in Broadcast Video," Proc. IEEE International. Workshop on Recog., Anal., and Tracking of Faces and Gestures in Real-Time Systems, 105–110, Kerkyra, Greece (1999), each incorporated by reference herein.

Decision Fusion

As previously indicated, the audio-video speaker identification process 500 executes an audio-video decision fusion process 900, shown in FIG. 9, during step 570 to evaluate the ranked lists produced by the audio-based and video-based speaker identification processes 700, 800 and determine the speaker of an utterance in accordance with the present invention.

The speaker identification process 700, discussed above in conjunction with FIG. 7, yields a single set of ranked identities for each audio segment. On the other hand, a single audio segment corresponds to multiple video frames with each video frame yielding a set of ranked face identities. Scores expressing the confidence in the respective class assignments are available with each ranked identity.

As shown in FIG. 9, n sets of ranked identities are initially abstracted into a single set of ranked identities, during steps 910 and 920, where n is the number of video frames which survive face detection in a given speaker segment. During step 910, the most frequent face identity (the statistical mode) at each rank across all the video frames corresponding to the audio speaker segment is found. During step 920, the median score for that rank is computed and assigned to the thusly derived most frequent face identity. We now have two sets of ranked identities, one audio-based and the other video-based.

During step 930, the audio speaker scores are scaled to a 0–1 range and normalized by the standard deviation of the scores of the ranked identities for each segment. (This normalization step is optional, but if done the scores are re-normalized.) This is repeated for the video segment scores. This operation makes the video and the audio scores compatible for the subsequent integration.

The decision fusion scheme of the present invention is based on linear combination of the audio and the video class assignments. Hence, we are immediately faced with the issue of weight selection. The weights assigned to the audio and the video scores affect the influence of their respective scores in the ultimate outcome. One approach is to use fixed weights, say 0.5, for each. According to one feature of the present invention, the weights are derived from the data itself.

Let $\{(rank_r, audioScore_r)|r=1 \ldots maxRank\}$ denote the scores for ranked identities for audio speaker class assignments in a rank-score coordinate system, where $rank_t$, represents the rank and $audioScore_t$, the audio score of the tth point. In the same manner, let $\{(rank_r, videoScore_r)|r=1 \ldots maxRank\}$ denote the corresponding data set for the video identities.

Figures 10A, 10B:
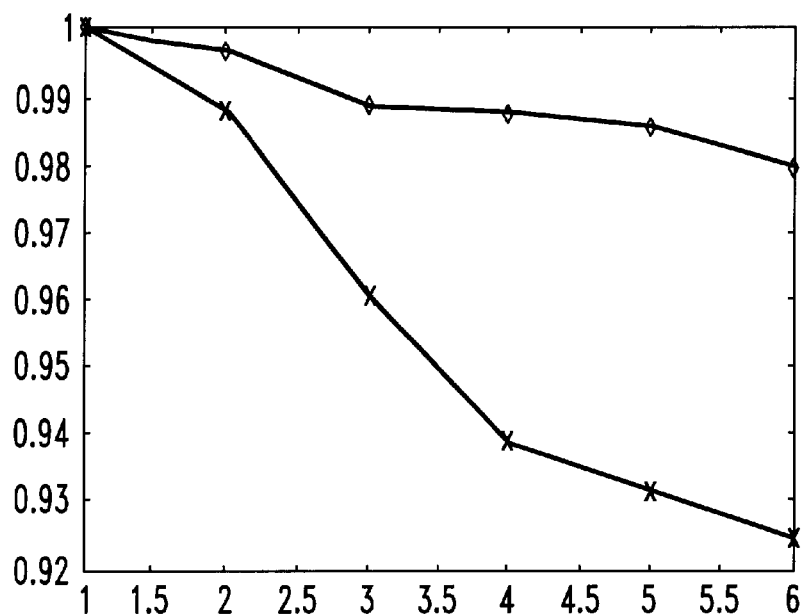
FIG. 10A illustrates the ranked identifier scores for audio and video for one audio segment with six rankings.
FIG. 10B illustrates the fused results for the top-six ranks for the audio segment shown in FIG. 10A.

FIG. 10A illustrates the ranked identifier scores for audio 1010 and video 1020 for one audio segment with six rankings. FIG. 10B illustrates the fused results for the top-six ranks for the audio segment shown in FIG. 10A. As shown in FIG. 10A, both audio-based and video-based vary monotonically along the rank axis. One implementation of the present invention imposes a linear variation on the rank-score data during step 940 by: (1) removing outliers using the Hough transform; and (2) fitting the surviving points set to a line using the least mean squares error method. Thus, the ranked identities output by the audio and video identification systems are reduced to two straight lines defined by:

audioScore=$m_1$×rank+$b_1$; and videoScore=$m_2$×rank+$b_2$.

The line with higher slope is assumed to convey more discriminative information. The normalized slopes of the two lines are used as the weight of the respective results when combining the scores from the audio-based and video-based speaker analysis.

With $w_1$ and $w_2$ representing audio and the video channels respectively, the fused score, $FS_k$, for each speaker is computed during step 950 as follows:

$$w_1 = \frac{m_1}{m_1+m_2} \text{ and } w_2 = \frac{m_2}{m_1+m_2}$$

$FS_k=w_1(m_{1\times rankk}+b_1) + w_2(m_2\times rank_k+b_2)$.

where $rank_k$ is the rank for speaker k.

The above expression is computed over the collection of audio and video speaker identities derived from the last step, and later sorted by score to obtain a new set of fused ranked identities. These fused identities maybe displayed to the user as the identified speaker result, and buffered alongside the turns for subsequent use in the speaker indexing.

It is to be understood that the embodiments and variations shown and described herein are merely illustrative of the principles of this invention and that various modifications may be implemented by those skilled in the art without departing from the scope and spirit of the invention.

What is claimed is:

1. A method for identifying a speaker in an audio-video source, said audio-video source having audio information and video information, said method comprising the steps of:
   processing said audio information to identify a plurality of potential speakers, each of said identified speakers having an associated confidence score;
   processing said video information to identify a plurality of potential individuals in an image, each of said identified individuals having an associated confidence score; and
   identifying said speaker in said audio-video source based on said audio and video information, wherein said audio and video information is weighted based on slope information derived from said confidence scores.

2. The method of claim 1, further comprising the step of imposing a linear variation on a list of said plurality of potential speakers and a list of said potential individuals.

3. The method of claim 2, wherein said step of step of imposing a linear variation further comprises the steps of removing outliers using a Hough transform and fitting the surviving points set to a line using a least mean square error method.

4. The method of claim 3, further comprising the step of representing said list of potential speakers as a straight line having a slope, $m_1$, and said list of potential individuals as a straight line having a slope, $m_2$, and wherein said slopes of said lines when normalized by their sum are used as the weight of the said audio and video information, respectively, during said identifying step.

5. The method of claim 4, wherein said identifying step further comprises the step of computing a fused score, $FS_k$, for each speaker as follows:

$FS_k=W_1(m_1\times rank_k+b_1) + w_2(m_{2\times rankk}+b_2)$ where $rank_k$ is the rank for speaker k, and $w_1$ and $w_2$ represent said audio and video information, respectively, as follows:

$$w_1 = \frac{m_1}{m_1+m_2} \text{ and } w_2 = \frac{m_2}{m_1+m_2}.$$

6. A method for identifying a speaker in an audio-video source, said audio-video source having audio information and video information, said method comprising the steps of:
   processing said audio information to identify a ranked-list of potential speakers, each of said identified speakers having an associated confidence score;
   processing said video information to identify a ranked-list of potential individuals in an image, each of said identified individuals having an associated confidence score; and
   identifying said speaker in said audio-video source based on said audio and video information, wherein said audio and video information is weighted based on slope information derived from said confidence scores.

7. The method of claim 6, further comprising the step of imposing a linear variation on said ranked-list of potential speakers and said ranked-list of potential individuals.

8. The method of claim 7, wherein said step of step of imposing a linear variation further comprises the steps of removing outliers using a Hough transform and fitting the surviving points set to a line using a least mean square error method.

9. The method of claim 8, further comprising the step of representing said ranked-list of potential speakers as a straight line having a slope, $m_1$, and said ranked-list of potential individuals as a straight line having a slope, $m_2$, and wherein said slopes of said lines are used as the weight of the said audio and video information, respectively, during said identifying step.

10. The method of claim 9, wherein said identifying step further comprises the step of computing a fused score, $FS_k$, for each speaker as follows:

$$FS_k = w_1(m_1 \times \text{rank}_k + b_1) + w_2(m_2 \times \text{rank}_k + b_2)$$

where $\text{rank}_k$ is the rank for speaker k, and $w_1$ and $w_2$ represent said audio and video information, respectively, as follows:

$$w_1 = \frac{m_1}{m_1 + m_2} \text{ and } w_2 = \frac{m_2}{m_1 + m_2}.$$

11. A system for identifying a speaker in an audio-video source, said audio-video source having audio information and video information, said system comprising:
 a memory that stores computer-readable code; and
 a processor operatively coupled to said memory, said processor configured to implement said computer-readable code, said computer-readable code configured to:
  process said audio information to identify a plurality of potential speakers, each of said identified speakers having an associated confidence score;
  process said video information to identify a plurality of potential individuals in an image, each of said identified individuals having an associated confidence score; and
  identify said speaker in said audio-video source based on said audio and video information, wherein said audio and video information is weighted based on slope information derived from said confidence scores.

12. A system for identifying a speaker in an audio-video source, said audio-video source having audio information and video information, said system comprising:
 a memory that stores computer-readable code; and
 a processor operatively coupled to said memory, said processor configured to implement said computer-readable code, said computer-readable code configured to:
  process said audio information to identify a ranked-list of potential speakers, each of said identified speakers having an associated confidence score;
  process said video information to identify a ranked-list of potential individuals in an image, each of said identified individuals having an associated confidence score; and
  identify said speaker in said audio-video source based on said audio and video information, wherein said audio and video information is weighted based on slope information derived from said confidence scores.

13. An article of manufacture for identifying a speaker in an audio-video source, said audio-video source having audio information and video information, said article of manufacture comprising:
 a computer readable medium having computer readable code means embodied thereon, said computer readable program code means comprising:
  a step to process said audio information to identify a plurality of potential speakers, each of said identified speakers having an associated confidence score;
  a step to process said video information to identify a plurality of potential individuals in an image, each of said identified individuals having an associated confidence score; and
  a step to identify said speaker in said audio-video source based on said audio and video information, wherein said audio and video information is weighted based on slope information derived from said confidence scores.

14. An article of manufacture for identifying a speaker in an audio-video source, said audio-video source having audio information and video information, said article of manufacture comprising:
 a computer readable medium having computer readable code means embodied thereon, said computer readable program code means comprising:
  a step to process said audio information to identify a ranked-list of potential speakers, each of said identified speakers having an associated confidence score;
  a step to process said video information to identify a ranked-list of potential individuals in an image, each of said identified individuals having an associated confidence score; and
  a step to identify said speaker in said audio-video source based on said audio and video information, wherein said audio and video information is weighted based on slope information derived from said confidence scores.

* * * * *

UNITED STATES PATENT AND TRADEMARK OFFICE
CERTIFICATE OF CORRECTION

PATENT NO. : 6,567,775 B1
DATED : May 20, 2003
INVENTOR(S) : Maali et al.

It is certified that error appears in the above-identified patent and that said Letters Patent is hereby corrected as shown below:

Column 8,
Line 17, replace "$(x_1,...x_i)$" with -- $(x_1,...x_i)$ --.
Lines 31-32, replace " $\Delta BIC_i = -\frac{n}{2}\log|_w| + \frac{i}{2}\log|\sum_f| + \frac{n-i}{2}\log|\sum_s| + \frac{1}{2}\lambda\left(d + \frac{d(d+1)}{2}\right)\log n$ " with -- $\Delta BIC_i = -\frac{n}{2}\log|\sum_w| + \frac{i}{2}\log|\sum_f| + \frac{n-i}{2}\log|\sum_s| + \frac{1}{2}\lambda\left(d + \frac{d(d+1)}{2}\right)\log n$ --.

Line 38, replace "$(x_1,...x_i)$" with -- $(x_1,...x_i)$ --.

Column 9,
Line 13, replace "$\Delta BIC_I$" with -- $\Delta BIC_i$ --.

Column 11,
Line 59, "Face Identification" should be a centered heading to the following paragraph.

Column 12,
Lines 18-22, replace " $S_{ik} = \frac{\sum_j a(j)a_i(j)}{\sqrt{\sum_j (a(j))^2 \sum_j (a_i(j))^2}}$ " with -- $S_{ik} = \frac{\sum_j a(j)a_i(j)}{\sqrt{\sum_j a(j)^2 \sum_j a_i(j)^2}}$ --.

Column 13,
Line 60, replace

" $FS_k = w_1(m_{1 \times rankk} + b_1) + w_2(m_2 \times rank_k + b_2)$ " with

-- $FS_k = w_1(m_1 \times rank_k + b_1) + w_2(m_2 \times rank_k + b_2)$ --.

UNITED STATES PATENT AND TRADEMARK OFFICE
CERTIFICATE OF CORRECTION

PATENT NO. : 6,567,775 B1
DATED : May 20, 2003
INVENTOR(S) : Maali et al.

It is certified that error appears in the above-identified patent and that said Letters Patent is hereby corrected as shown below:

<u>Column 14,</u>
Lines 24 and 66, after "said" replace "step of step of" with -- step of --.
Line 40, replace " $FS_k = W_1(m_1 \times rank_k + b_1) + w_2(m_{2 \times rank\, k} + b_2)$ " with -- $FS_k = w_1(m_1 \times rank_k + b_1) + w_2(m_2 \times rank_k + b_2)$ --.

Signed and Sealed this

Twenty-ninth Day of November, 2005

JON W. DUDAS
*Director of the United States Patent and Trademark Office*